United States Patent
Tsai et al.

(10) Patent No.: US 11,567,000 B2
(45) Date of Patent: Jan. 31, 2023

(54) METHOD OF INFRARED SPECTROMETRIC MEASUREMENT OF TUNNEL GAS

(71) Applicant: SINOTECH ENGINEERING CONSULTANTS, INC., Taipei (TW)

(72) Inventors: Cheng-Hsien Tsai, Taipei (TW); Fu-Yuan Hsiao, Taipei (TW); Shu-Yung Chi, Taipei (TW); Chih-Hao Yang, Taipei (TW); Shih-Hui Wang, Taipei (TW)

(73) Assignee: SINOTECH ENGINEERING CONSULTANTS, INC., Taipei (TW)

( * ) Notice: Subject to any disclaimer, the term of this patent is extended or adjusted under 35 U.S.C. 154(b) by 309 days.

(21) Appl. No.: 17/076,060

(22) Filed: Oct. 21, 2020

(65) Prior Publication Data

US 2021/0116363 A1 Apr. 22, 2021

(30) Foreign Application Priority Data

Oct. 22, 2019 (TW) .................................. 108138125

(51) Int. Cl.
*G01N 21/3504* (2014.01)
(52) U.S. Cl.
CPC . *G01N 21/3504* (2013.01); *G01N 2021/3509* (2013.01); *G01N 2021/3513* (2013.01)

(58) Field of Classification Search
CPC ....... G01N 21/3504; G01N 2021/3509; G01N 2021/3513
See application file for complete search history.

(56) References Cited

FOREIGN PATENT DOCUMENTS

TW M563548 U * 7/2018 ......... G01N 21/3504

* cited by examiner

*Primary Examiner* — Jamil Ahmed
(74) *Attorney, Agent, or Firm* — Muncy, Geissler, Olds & Lowe, P.C.

(57) ABSTRACT

The present invention discloses a method of infrared spectrometric measurement of tunnel gas employing a gas measurement system including a gas collection unit, a gas analysis unit and a positioning indication unit for measuring the gas in the tunnel. The method performs sequential steps of installing the gas measurement system, starting the positioning indication unit for positioning one of the detection regions in the tunnel space, sampling the gas in the detection region through the gas collection unit, analyzing the gas by the gas analysis unit, generating a gas analysis result, and determining whether all of the detection regions are completed. With the newly designed gas collection unit in collocation with the gas analysis unit and the positioning indication unit, the method of the present invention does not only fast install the whole gas measurement system, but also well understands all preliminary information related to the harmful gas in the tunnel like sort and concentration, thereby instantly taking correct measures.

7 Claims, 6 Drawing Sheets

METHOD OF INFRARED SPECTROMETRIC MEASUREMENT OF TUNNEL GAS

CROSS-REFERENCE TO RELATED APPLICATION

This application claims the priority of Taiwanese patent application No. 108138125, filed on Oct. 22, 2019, which is incorporated herewith by reference.

BACKGROUND OF THE INVENTION

1. Field of the Invention

The present invention generally relates to a method of measuring tunnel gas, and more specifically to a method of infrared spectrometric measurement of tunnel gas employing a newly designed gas collection unit in collocation with a gas analysis unit and a positioning indication unit so as to not only fast install a whole gas measurement system, but also well understand all preliminary information related to the flammable and harmful gas in the tunnel comprising the sort and concentration so as to help instantly take correct measures.

2. The Prior Arts

In the traditional process of tunnel construction, if the ground or the mountain to be dug or excavated is full of coal, oil, or gas, the flammable and harmful gas possibly seeps or leaks into the tunnel under construction, and it exists high risk of sudden explosion even if the concentration of the gas is very low, particularly in the limited space. Thus, explosion may cause a great deal of damage without appropriate preventive measures prepared in advance.

One of the general schemes in the prior arts to overcome the above problem is that a gas detector is provided and fixed at every preset fixed mileage along the whole tunnel construction region to readily monitor the sort and the concentration of the harmful gas so as to closely control environmental air quality and effectively prevent the operators on the scene from risk like a great deal of harmful gas abruptly leaking into the tunnel.

The drawback in the prior arts is that the fixed gas detector is implemented by electrochemistry or catalyst, and the sensitivity for most flammable and harmful gases like methane gas is not enough, usually only 500 ppm. In other words, the concentration below 1% LEL for methane is not detected. It is thus a dead point of detection at the early stage of the tunnel construction to track and detect the concentration and contribution of the flammable and harmful gas slightly leaking.

Therefore, it is greatly needed to provide a new method of infrared spectrometric measurement of tunnel gas intended to fast detect the concentration and rough distribution of the unknown and harmful gas in the tunnel space, predict the concentration and distribution of the flammable and harmful gas in every region of the tunnel under construction, take appropriate measures to deal with the event of a great deal of the flammable and harmful gas abruptly leaking, and avoid any risk due to no time to respond, thereby overcoming the problems in the prior arts.

SUMMARY OF THE INVENTION

The primary objective of the present invention is to provide a method of infrared spectrometric measurement of tunnel gas comprising sequential steps S10, S20, S30, S40, S50, and S70, and employing a newly designed gas collection unit in collocation with a gas analysis unit and a positioning indication unit for measuring the gas in the tunnel space.

Specifically, the method begins at the step S10 by providing the gas measurement system in the tunnel, and connecting the gas measurement unit to the gas analysis unit. Then, the step S20 is performed by starting the positioning indication unit to emit a plurality of laser beams onto a wall of the tunnel space in the tunnel so as to form a plurality of laser spots on the wall. The laser beams and the laser spots are employed to divide the tunnel space into a plurality of detection regions, each having a shape of circular sector. In the step S30, one of the above detection regions is selected as a target detection region, and the gas collection unit samples and transfers the gas in the target detection region to the gas analysis unit. In the step S40, the gas analysis unit analyzes the gas from the gas collection unit. Specifically, the gas analysis unit comprises a spectrometer and an analysis computer. The spectrometer is substantially a mobile gas Fourier transformation Infrared spectrometer (FTIR), and electrically connected to the analysis computer provided with a display function. The spectrometer is controlled by the analysis computer to operate. The spectrometer has a connection port for connecting the gas collection unit to receive and detect the gas in the target detection region to generate and transmit a spectrum analysis data to the analysis computer. In the step S50, the analysis computer analyzes the gas in the target detection region based on the spectrum analysis data to generate and display an analysis result. The step S60 is then performed by determine whether all of the detection regions are analyzed and completed or not. If any detection region is not analyzed, return back to the step S30, and select another detection region as the target detection region for analysis. When all of the detection regions are analyzed, the step S70 is executed to end up for the whole operation of the infrared spectrometric measurement of tunnel gas.

Overall, the present invention employs the newly designed gas collection unit in collocation with the gas analysis unit and the positioning indication unit to fast install the whole gas measurement system and further understand all information related to the harmful gas in the tunnel like sort and concentration so as to instantly take correct measures.

Furthermore, the method of the present invention is allowed to scheme appropriate measures in advance for high risk regions with possibly leaking flammable gas so as to prevent damage resulting from a great deal of unexpected leaking gas in the process of tunnel construction.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
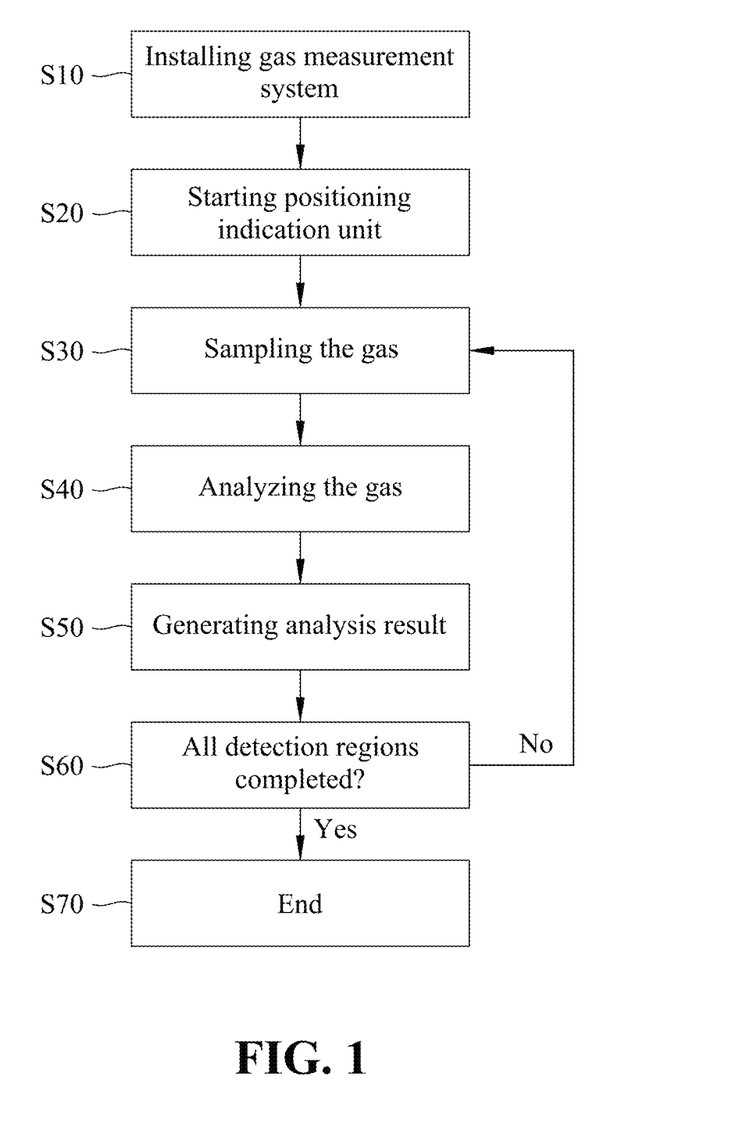
FIG. 1 is a flowchart of the method of infrared spectrometric measurement of tunnel gas according to the embodiment of the present invention.
Figure 2:
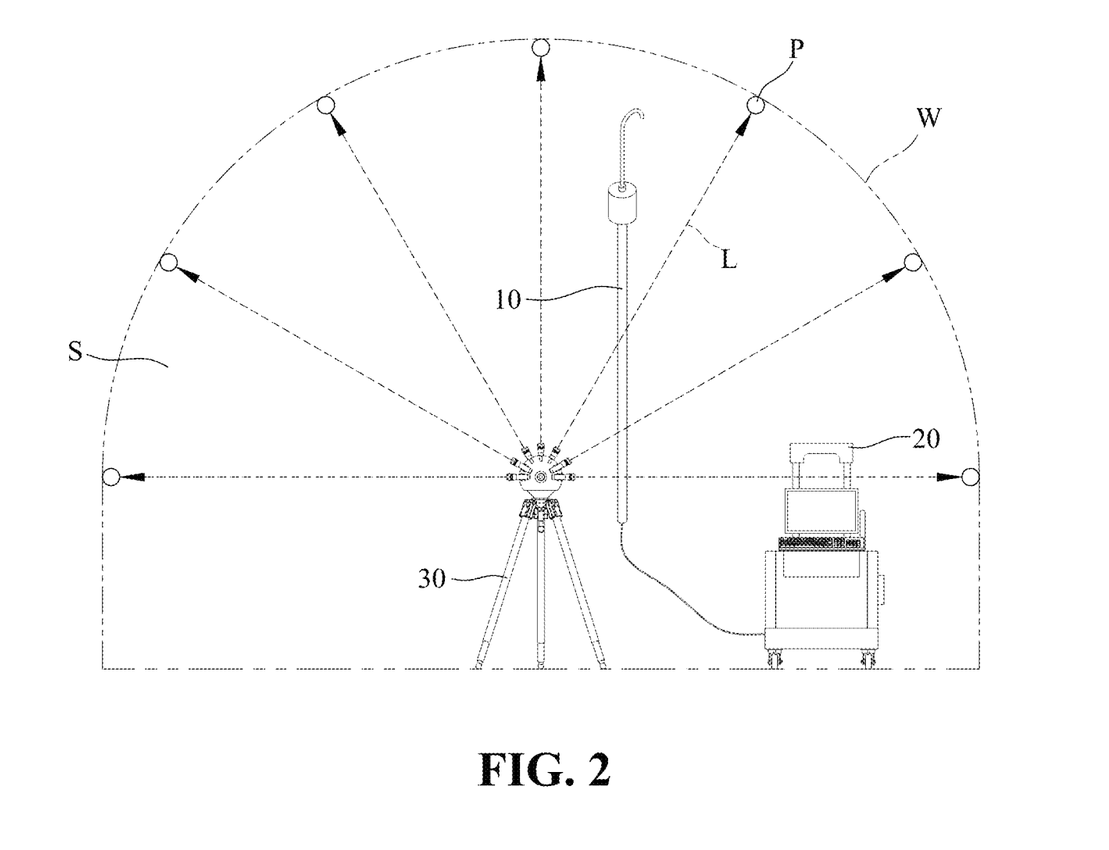
FIG. 2 a view showing of the system of measuring tunnel gas used in the method according to the embodiment of the present invention.

Please refer to FIGS. 1 and 2 illustrating the flowchart of the method of infrared spectrometric measurement of tunnel gas according to the embodiment of the present invention, and the system of measuring tunnel gas used in the method, respectively. The method of the present invention generally comprises a plurality of sequential steps S10, S20, S30, S40, S50, and S70 as shown in FIG. 1, and employs the system of measuring tunnel gas having a newly designed gas collection unit 10 in collocation with a gas analysis unit 20 and a positioning indication unit 30 for measuring tunnel gas in the tunnel space S as shown in FIG. 2.

Figure 3:
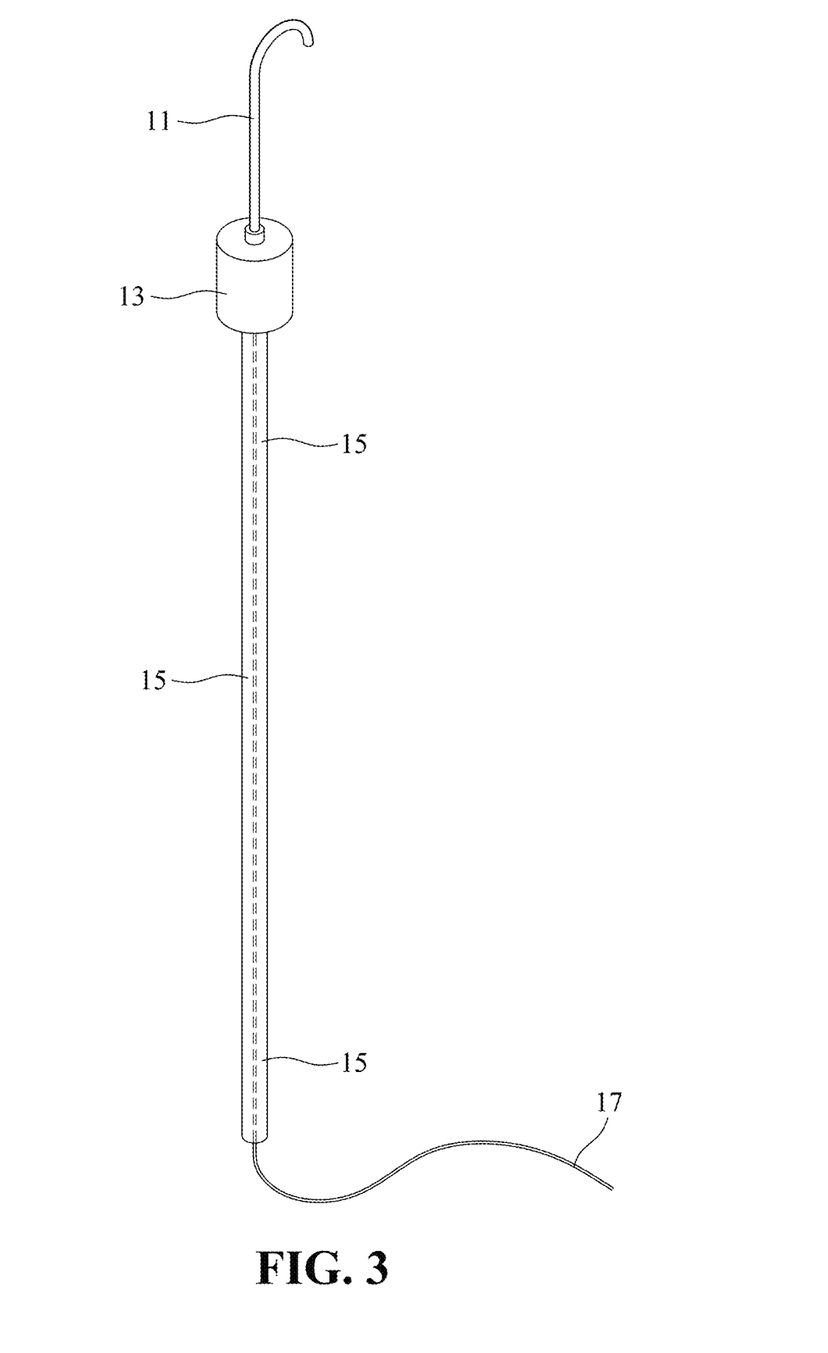
FIG. 3 a view showing of the gas collection unit used in the method according to the embodiment of the present invention.
Figure 4:
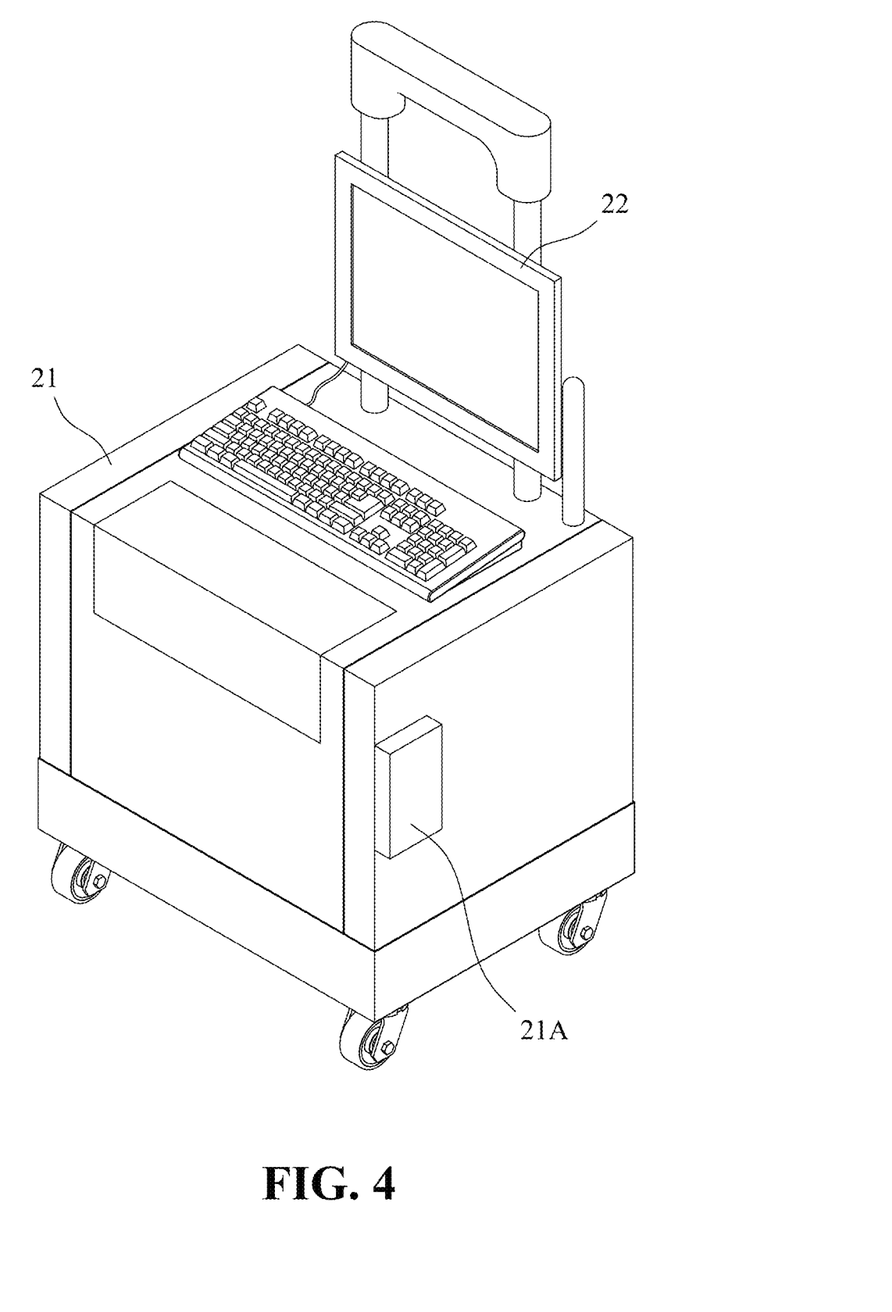
FIG. 4 a view showing of the gas analysis unit used in the method according to the embodiment of the present invention.
Figure 5:
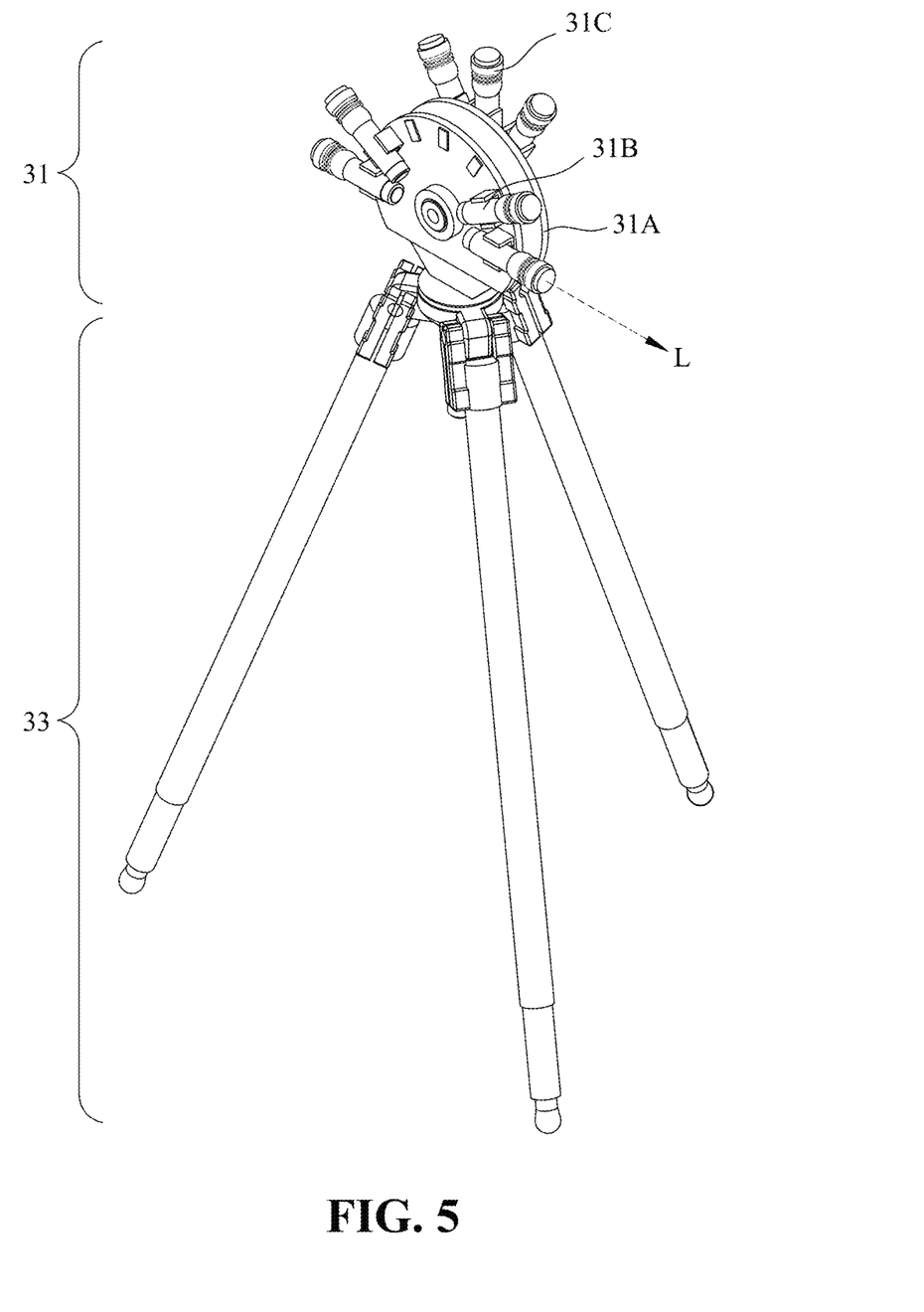
FIG. 5 a view showing of the positioning indication unit used in the method according to the embodiment of the present invention.

Further, the gas collection unit 10, the gas analysis unit 20, and the positioning indication unit 30 are respectively illustrated in detail in FIGS. 3, 4, and 5. The gas collection unit 10 comprises a gas sampling head 11, an air filter 13, a plurality of sampling support tubes 15, and a gas collection line 17. It should be noted that only three sampling support tubes 15 are shown for exemplary description, and not intended to limit the scope of the present invention. The gas analysis unit 20 comprises a spectrometer 21 and an analysis computer 22, and the positioning indication unit 30 comprises a light positioning emitter 31 and a support rack 33.

Specifically, the above gas sampling head 11 is connected to the air filter 13, and the sampling support tubes 15 are assembled together one by one and connected from the air filter 13 to the gas collection line 17. It is preferred that the each of the sampling support tube 15 is light and connectable as well as formed of black carbon fiber with high strength. Or alternatively, the sampling support tube 15 is formed of white Polytetrafluoroethylene (PTFE). Thus, external gas enters the air filter 13 by suction through the gas sampling head 11 to screen off powder, solid particles, and micro impurities, and then flows to the sampling support tubes 15 to the gas collection line 17.

The spectrometer 21 of the gas analysis unit 20 is electrically connected to the analysis computer 22, and operates under control of the analysis computer 22. Particularly, the spectrometer 21 is provided with a connection port for connecting the gas collection line 17, and is preferably a mobile gas Fourier transformation spectrometer (FTIR).

Further, the light positioning emitter 31 of the positioning indication unit 30 is connected to and fixed on the support rack 33 like a tripod. For example, the support rack 33 is made of stainless steel to support the light positioning emitter 31, but not intended to limit the scope of the present invention. The light positioning emitter 31 specifically comprises a circular support plate 31A, a plurality of sleeve sockets 31B, and a plurality of laser emitters 31C. The sleeve sockets 31B are provided on the circular support plate 31A, specifically close to the edge of the circular support plate 31A, and radially spaced and arranged for accommodating the laser emitters 31C to insert into and fix. Each of the laser emitters 31C is intended to emit a laser beam L as an arc length. Thus, all of the laser beams L are radially and outwards incident onto the wall W.

It is preferred that the laser emitters 31C are powered by rechargeable battery (not shown) like lithium battery to emit the laser beams L such as green laser beams. In addition, the positioning indication unit 30 may further comprise a latch (not shown) on the middle region of the circular support plate 31A for rotating the circular support plate 31A to change the incident direction of ach laser beam. Further, the positioning indication unit 30 is provided with a front dial scale and a back dial scale (not shown), respectively attached and fixed to the front and back sides of the circular support plate 31A. In particular, each of the front dial scale and the back dial scale has a plurality of scale marks, and the sleeve sockets 31B are intended to place on the scale marks. Thus, when the latch rotates, all of the laser emitters 31C on the front dial scale and the back dial scale rotate at a time, and the incident direction of each laser beams L is changed.

First, the method of the present invention begins at the step S10 by installing the gas measurement system in the tunnel. The gas collection unit 10 is connected to the gas analysis unit 20, and the gas collection line 17 of the gas collection unit 10 is specifically, connected to the connection port 21A of the gas analysis unit 20. Further, the positioning indication unit 30 is placed at a specific location on the ground in the tunnel. For instance, it is set on the central axis of the tunnel invert.

Then, the step S20 is performed by starting the positioning indication unit 30 such that the laser beams L from the laser emitters 31C are incident onto the wall W of the tunnel space S to form a plurality of laser spots P on the wall W, and at the same time, the laser beams L divide the tunnel space S into a plurality of detection regions, each having a shape of circular sector. That is, the laser beams L are equivalent to physical lines for the operator on the scene to clearly identify each detection region.

In the step S30, the gas measurement unit 10 is employed to sample and collect the gas. Specifically, one of the detection regions in the tunnel space S is selected as a target detection region, and the gas sampling head 11 is placed in the target detection region. The spectrometer 21 of the gas analysis unit 20 extracts the gas in the target detection region through the connection port 21A, and the gas is further expelled to flow through the gas sampling head 11, the air filter 13, and the sampling support tubes 15 to the gas collection line 17 for implementing gas sampling and collecting.

In the step S40, the gas analysis unit 20 is used to spectrometric analyze the gas from the target detection region through the gas collection unit 10. In other words, the spectrometer 21 of the gas analysis unit 20 performs a Fourier transformation spectrometer analysis on the gas to generate and transmit a spectrum analysis data to the analysis computer 22. Then, the analysis computer 22 in the step S50 qualitatively and quantitatively analyzes the gas in the target detection region based on the spectrum analysis data to generate and display an analysis result. For instance, the analysis result comprises numbers and figures to indicate the sort and concentration of the gas.

Next, the step S60 is performed to determine whether all of the detection regions in the tunnel space S are analyzed and completed or not, If any one of the detection regions is not analyzed, the method returns back to the step S30 to select another detection region as the target detection region for analysis, and the gas sampling head 11 is placed in the new target detection region for the subsequent operations as mentioned above. If all detection regions are analyzed and completed, the step S70 is performed to end up the whole operation of the method of measuring tunnel gas.

Moreover, the front end of the gas sampling head 11 is specifically designed with a hook to prevent the gas collection line 17 from extracting dust or vapor at the beginning. The air filter 13 preferably has an outer case made of PTFE, and the filtration stuff provided in the air filter 13 is made of polypropylene (PP) to particularly screen off the dust or particle more than 10 µm, thereby preventing the front end of the gas collection unit 10 from blocking by larger dust or particle. The sampling support tubes 15 are hollow for easily and quickly assembling, and the gas collection line 17 made of PTFE is accommodated in the hollow part and thus steadfastly supported by the sampling support tubes 15 The gas collection line 17 is specifically designed with excellent resistance to acids, bases, and corrosion.

Further, the above spectrometer 21 comprises a gas pipe loop and an interferometer. The gas pipe loop is integrated with a vacuum pump employing a brushless motor such that the flow rate of the gas is up to 10 LPM and more, and the vacuum pump is intended to attain a specific degree of vacuum. After vacuuming, the residual pressure is approximately equal to 0.3 atm. Also, the spectrometer 21 is provided with an internal Infrared source to emit Infrared, which is employed to analyze the gas extracted into an optic path detection chamber through the gas collection line 17 so as to acquire the properties of the gas. Additionally, the analysis computer 22 is provided with a host computer for analysis and control, and a screen for displaying so as to precisely control and instantly monitor the operations of gas sampling, starting, and analysis of the whole system. The analysis computer 22 is particularly in collocation with the spectrometer 21 to receive the electrical signal as the above spectrum analysis data from analysis computer 22 after Fourier transformation, and the spectrum analysis data is further compared with the built-in database of the standard gases to acquire the sort and concentration of the gas.

More specifically, the laser beams L emitted by the light positioning emitter 31 like a green laser beam with emission power of 5 mV and wavelength of 532 nm are intended to provide a function of separating the detection regions in the tunnel space, and the vertical cross section of the tunnel from the arch top of the tunnel is divided by the laser beams L into the detection regions spaced away by a specific degree such as 30 degrees, each detection region as a circular sector with 30 degrees.

Figure 6:
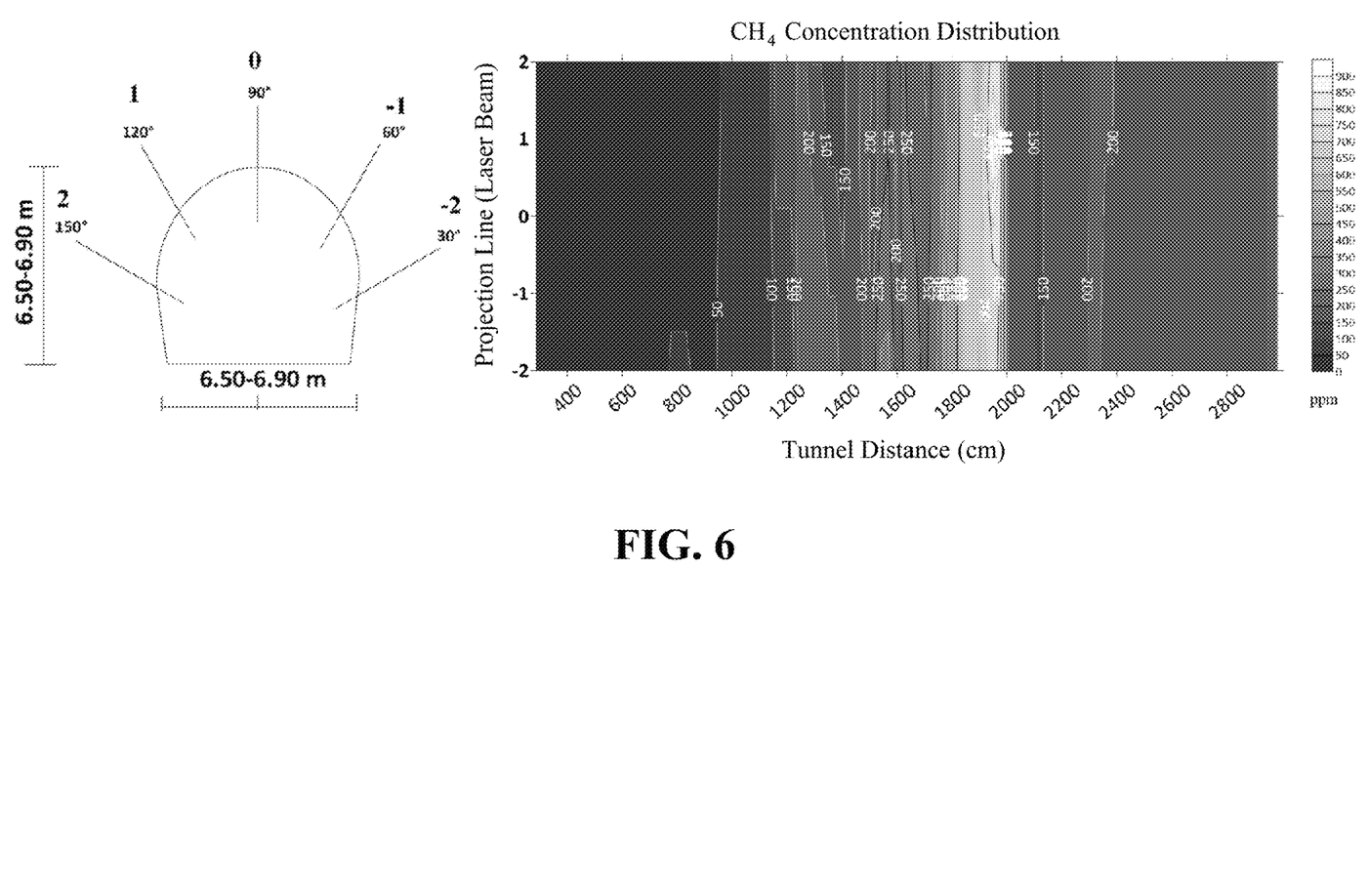
FIG. 6 a view showing of the analysis result of one exemplary case for the method according to the embodiment of the present invention.

Overall, the method of the present invention starts the light positioning indication unit after the gas collection unit and the gas analysis unit are assembled to position the tunnel cross sectional space. Then, the spectrometer triggers the vacuum pump under control of the analysis computer to extract the gas in the tunnel space for sampling and analysis. After about 16 seconds, the gas sampled around the gas sampling head of the gas measurement unit is processed through qualitative and semi-quantitative gas analysis. Finally, after all of the cross sections of the tunnel space along the tunnel are detected and analyzed, the analysis data is integrated to sketch a planar projection figure with gas concentration (ppm) to clearly understand the concentration distribution of each harmful gas in the tunnel. As shown in FIG. 6, the analysis result of one exemplary case for the method of the present invention comprises the projection figure with isograms for methane gas, and the left side also illustrates the concentration distribution for the operator on the scene to well understand the current situation.

Therefore, the method of the present invention can readily detect and analyze the gas in the tunnel for each stage in tunnel construction to instantly monitor distribution of harmful gas and variation of concentration in the gas leaking region and guarantee safety of tunnel construction, thereby possibly finding out a great deal of gas abruptly extruding in advance and providing an effective preventive measure and capability for life and safety. In addition, the present invention may increase detection sensitivity of harmful gas to the highest resolution to 1 ppm, and at the same time, employs the mobile gas Fourier transformation Infrared spectrometer to effectively detect and analyzes many unknown gases like 380 gases more. It is appropriate for the method of the present invention to operate within a narrow corridor or space.

From the above mention, the aspect of present invention is to employ the newly designed gas collection unit in collocation with the gas analysis unit and the positioning indication unit so as to fast install the whole gas measurement system and particularly well understand the sort and concentration of the harmful gas in the tunnel, thereby instantly taking correct measures. Furthermore, the method of the present invention is able to monitor high risk regions with flammable gas leaking during the whole process of tunnel construction so as to plan effective measures and avoid damage caused by a great deal of gas leakage.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of infrared spectrometric measurement of tunnel gas, comprising:
   a step S10, providing a gas measurement system comprising a gas collection unit, a gas analysis unit, and a positioning indication unit in a tunnel, and connecting the gas collection unit to the gas analysis unit;
   a step S20, starting the positioning indication unit to emit a plurality of laser beams onto a wall of the tunnel space in the tunnel to form a plurality of laser spots on the wall, the laser beams and the laser spots employed to divide a tunnel space of the tunnel into a plurality of detection regions, each having a shape of circular sector;
   a step S30, selecting one of the detection regions as a target detection region, the gas collection unit sampling and transferring the gas in the target detection region to the gas analysis unit;
   a step S40, employing the gas analysis unit to analyze the gas from the gas collection unit, the gas analysis unit comprising a spectrometer and an analysis computer, the spectrometer being a mobile gas Fourier transformation Infrared spectrometer (FTIR) and electrically connected to the analysis computer provided with a display function, the spectrometer being controlled by the analysis computer to operate, the spectrometer having a connection port for connecting the gas collection unit to receive and detect the gas in the target detection region to generate and transmit a spectrum analysis data to the analysis computer;

a step S50, employing the analysis computer to analyze the gas in the target detection region based on the spectrum analysis data to generate and display an analysis result;

a step S60, determining whether all of the detection regions are analyzed and completed or not, if any detection region not analyzed, returning back to the step S30 and selecting another detection region as the target detection region for analysis; and a step S70, ending up the operation of the method infrared spectrometric measurement of tunnel gas, wherein the analysis result comprises a data and a figure for indicating a sort and concentration of the gas in the detection region.

2. The method as claimed in claim 1, wherein the positioning indication unit is powered by a rechargeable lithium battery to emit a plurality of laser beams, and the laser beam is a green laser beam.

3. The method as claimed in claim 1, wherein the gas collection unit comprises a gas sampling head, an air filter, a plurality of sampling support tubes, and a gas collection line, the gas sampling head has a front end provided with a hook, the gas sampling head is connected to the air filter, the sampling support tubes are assembled together one by one and connected between the air filter and the gas collection unit, the gas in the target detection region is extracted into the air filter from the gas collection unit to screen out dust, particle, and solid impurities, the gas further flows to the sampling support tubes to the gas collection line, and the gas collection line is intended to connect a connection port of the spectrometer.

4. The method as claimed in claim 3, wherein the sampling support tube is made of black carbon fiber with a feature of being light and connectable, or the sampling support tube is made of white Polytetrafluoroethylene (PTFE).

5. The method as claimed in claim 1, wherein the positioning indication unit comprises a light positioning emitter and a support rack, the light positioning emitter is connected and fixed to the support rack, the light positioning emitter comprises a circular support plate, a plurality of sleeve sockets, and a plurality of laser emitters, the sleeve sockets are provided on the support plate, close to an edge of the support plate, and radially arranged and spaced apart for inserting and fixing the laser emitters, each of the laser emitters emits the laser beam, and the laser beam travels towards the edge of the support plate, and is radially and outwards incident onto the wall of the tunnel.

6. The method as claimed in claim 5, wherein the support rack is a tripod.

7. The method as claimed in claim 5, wherein the positioning indication unit further comprises a latch provided at a middle region of the support plate for rotating the support plate to change an incident direction of each of the laser beams.

\* \* \* \* \*